United States Patent
Guan et al.

(10) Patent No.: US 11,812,411 B2
(45) Date of Patent: Nov. 7, 2023

(54) SYSTEMS AND METHODS OF VEHICLE-TO-EVERYTHING (V2X) SECURITY

(71) Applicant: QUALCOMM Incorporated, San Diego, CA (US)

(72) Inventors: Xuepan Guan, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 17/197,915

(22) Filed: Mar. 10, 2021

(65) Prior Publication Data

US 2022/0295449 A1  Sep. 15, 2022

(51) Int. Cl.
| | | |
|---|---|---|
| H04W 4/00 | (2018.01) | |
| H04W 72/02 | (2009.01) | |
| H04W 4/40 | (2018.01) | |
| H04W 76/25 | (2018.01) | |
| H04W 76/27 | (2018.01) | |
| H04W 8/08 | (2009.01) | |
| H04W 12/0431 | (2021.01) | |
| H04W 12/106 | (2021.01) | |
| H04W 60/04 | (2009.01) | |

(52) U.S. Cl.
CPC ............. *H04W 72/02* (2013.01); *H04W 4/40* (2018.02); *H04W 8/08* (2013.01); *H04W 12/0431* (2021.01); *H04W 12/106* (2021.01); *H04W 60/04* (2013.01); *H04W 76/25* (2018.02); *H04W 76/27* (2018.02)

(58) Field of Classification Search
CPC ..... H04W 12/106; H04W 4/40; H04W 72/02; H04W 72/04; H04W 72/40
See application file for complete search history.

(56) References Cited

U.S. PATENT DOCUMENTS

| | | | |
|---|---|---|---|
| 10,848,965 B1 * | 11/2020 | Budhathoki | H04W 12/121 |
| 2015/0087322 A1 * | 3/2015 | Maguire | H04W 60/06 455/450 |
| 2018/0013685 A1 * | 1/2018 | Yu | H04L 43/0829 |
| 2018/0041930 A1 * | 2/2018 | Hampel | H04W 76/11 |
| 2018/0367958 A1 * | 12/2018 | Dizdarevic | G08G 1/096716 |
| 2020/0021993 A1 * | 1/2020 | Yang | H04L 9/3268 |
| 2020/0146094 A1 * | 5/2020 | Wu | H04W 4/70 |
| 2021/0400489 A1 * | 12/2021 | Starsinic | H04W 4/50 |

* cited by examiner

*Primary Examiner* — Shantell L Heiber
(74) *Attorney, Agent, or Firm* — Arun Swain

(57) ABSTRACT

A method of wireless communication includes receiving, by a user equipment (UE), a system information block of type 21 (SIB21) from a network device. The SIB21 indicates a communication resource pool associated with a sidelink. The method further includes receiving one or more messages from the network device based on receiving the SIB21 and prior to communicating using the communication resource pool. The method further includes communicating, based on verifying an identity of the network device based on the one or more messages, via the sidelink using the communication resource pool and based on a vehicle-to-everything (V2X) wireless communication protocol.

30 Claims, 6 Drawing Sheets

SYSTEMS AND METHODS OF VEHICLE-TO-EVERYTHING (V2X) SECURITY

TECHNICAL FIELD

Aspects of the present disclosure relate generally to wireless communication systems, and more particularly, to vehicle-to-everything (V2X) wireless communication systems.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes receiving, by a user equipment (UE), a system information block of type 21 (SIB21) from a network device. The SIB21 indicates a communication resource pool associated with a sidelink. The method further includes receiving one or more messages from the network device based on receiving the SIB21 and prior to communicating using the communication resource pool. The method further includes communicating, based on verifying an identity of the network device based on the one or more messages, via the sidelink using the communication resource pool and based on a vehicle-to-everything (V2X) wireless communication protocol.

In some other aspects of the disclosure, an apparatus for wireless communication includes a receiver configured to receive a SIB21 from a network device. The SIB21 indicates a communication resource pool associated with a sidelink. The receiver is further configured to receive, based on receiving the SIB21 and prior to communicating using the communication resource pool, one or more messages from the network device. The apparatus further includes a transmitter configured to communicate, based on verifying an identity of the network device based on the one or more messages, via the sidelink using the communication resource pool and based on a V2X wireless communication protocol.

In some other aspects of the disclosure, a method of wireless communication includes receiving, by a UE, a SIB21 from a network device, and based on receiving the SIB21, transmitting, by the UE, a sidelink UE information message to the network device. The sidelink UE information message is associated with a V2X wireless communication protocol. The method further includes receiving, by the UE, a response to the sidelink UE information message from the network device. The response indicates a grant of a V2X configuration to the UE. The method further includes, after verifying an identity of the network device based on a security verification operation, communicating, by the UE, using the V2X configuration and based on the V2X wireless communication protocol.

In some other aspects of the disclosure, an apparatus for wireless communication includes a receiver configured to receive a SIB21 from a network device and a transmitter configured to transmit, based on receiving the SIB21, a sidelink UE information message to the network device. The sidelink UE information message is associated with a V2X wireless communication protocol. The receiver is further configured to receive a response to the sidelink UE information message from the network device, and the response indicates a grant of a V2X configuration to the UE. The transmitter is further configured to communicate, after verification of an identity of the network device based on a security verification operation, using the V2X configuration and based on the V2X wireless communication protocol.

DETAILED DESCRIPTION

Figure 1:
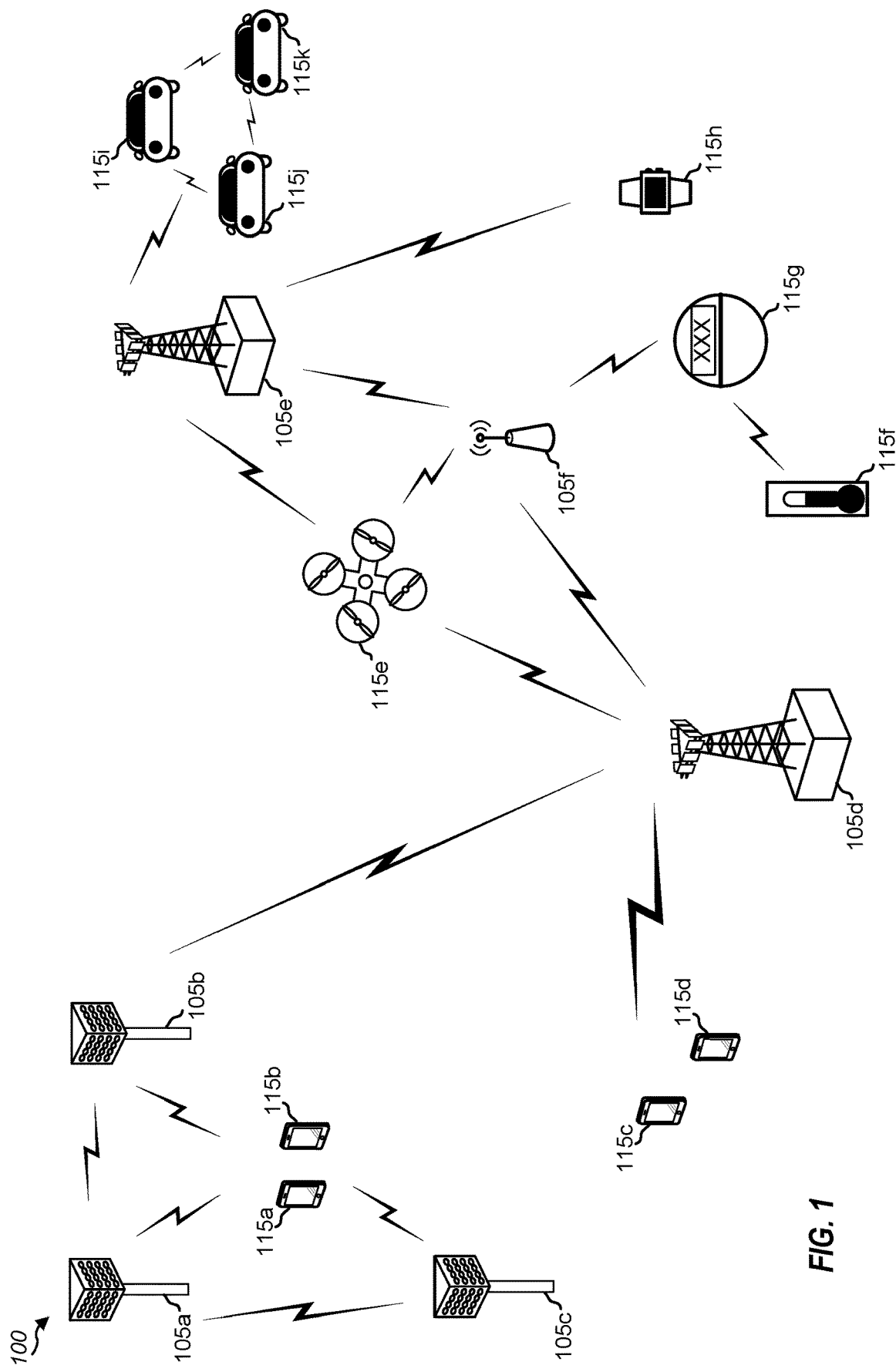
FIG. 1 is a block diagram illustrating an example of a wireless communication system according to some aspects of the disclosure.

Wireless communication networks provide connectivity to an increasing number and type of devices. An example of a wireless communication network is a vehicle-to-everything (V2X) wireless communication network. A V2X wireless communication network may enable a user equipment (UE) device (such as a vehicle) to communicate with other devices. For example, a vehicle may use a V2X wireless communication network to communicate with a base station, other vehicles, road infrastructure components, or other devices. In some cases, V2X wireless communication networks may enable rapid communication of important messages, such as accident or emergency information.

Because a V2X wireless communication network may involve quickly moving devices and important messages (e.g., a car on a highway transmitting emergency information), ensuring network security may be difficult. For example, certain authentication procedures between a base station and a UE device may take a relatively long time, which may introduce delay or latency to communication of important information. Further, the authentication procedures may involve transmission of messages, which may use network resources (which may reduce reliability of the network or add additional delay or latency in some cases). If the authentication procedures are not used, then a "malicious" device may use the V2X wireless communication network to transmit false information, such as a message that slows traffic by indicating a fake accident.

A V2X wireless communication network according to some aspects of the disclosure may use one or more messages to verify the identity of a base station prior to performing certain V2X communications. For example, prior to communicating using a communication resource pool indicated by the base station, a UE device may verify the identity of the base station using one or more of an authentication and key agreement (AKA) message, a tracking area update (TAU) message, an radio resource control (RRC) message having a valid integrity check value, or a non-access stratum (NAS) message having a valid integrity check value. Alternatively or in addition, prior to communicating using a V2X configuration indicated by the base station, a UE device may verify the identity of the base station using one or more of an access stratum (AS) security procedure or an NAS security procedure.

By verifying the identity of the base station prior to using resources indicated by the base station, a UE device may avoid transmitting a "false alarm" message. For example, in some circumstances, a malicious device may present itself (e.g., using a spoofing technique) as a base station and may grant the resources to the UE device. After granting the resources to the UE device, the malicious device may transmit a false alarm message to the UE device. In certain conventional systems, the UE device may be enabled to retransmit the message using the resources, which may spread a false alarm to other UE devices. In accordance with some aspects of the disclosure, by verifying the identity of the base station prior to using the resources, the UE device may avoid retransmitting a false alarm message spread by a malicious device.

To further illustrate, aspects of the disclosure may used in connection with one or more wireless communication networks, such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
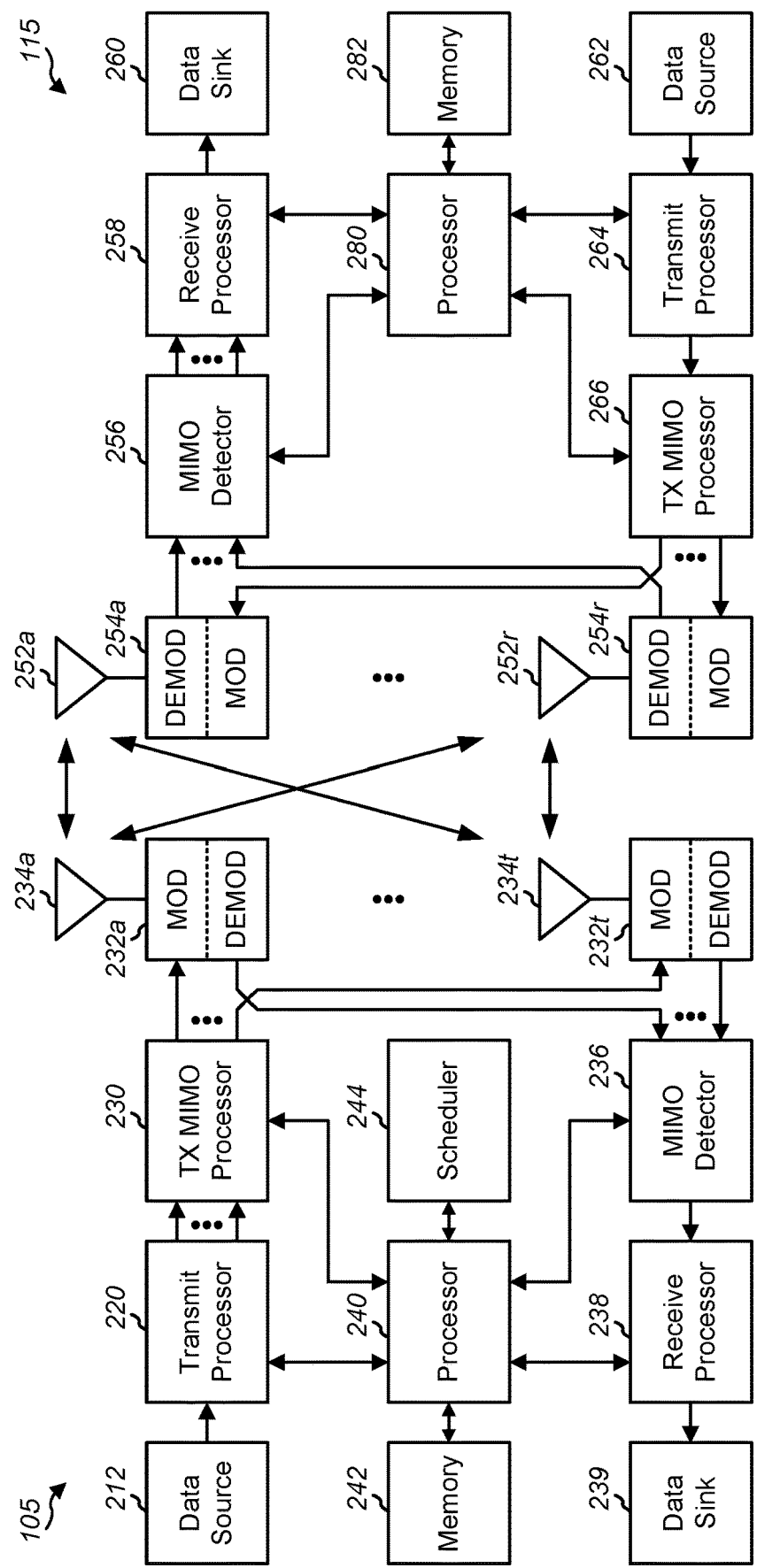
FIG. 2 is a block diagram illustrating examples of a base station and a UE according to some aspects of the disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for the physical uplink shared channel (PUSCH)) from data source 262 and control information (e.g., for the physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to processor 240.

Processors 240 and 280 may direct the operation at base station 105 and UE 115, respectively. Processor 240 and/or other processors and modules at base station 105 and/or processor 280 and/or other processors and modules at UE 115 may perform or direct the execution of various processes for the techniques described herein, such as to perform or direct the execution illustrated in FIGS. 5 and 6, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Some V2X wireless communication protocols use dynamic grants (DGs) and configured grants (CGs) for sidelinks (e.g., a PSCCH or PSSCH). A DG may provide a one-time grant of sidelink resources, which may be responsive to dynamic demand for sidelink communication. A CG may provide a grant of sidelink resources enabling continued, periodic, or repeated sidelink communication. A first type of sidelink resource grant (Type 1) may use RRC signaling to configure a UE with resources of a CG. A second type of sidelink resource grant (Type 2) of may use DCI over a PDCCH to configure a UE with resources of a DG or a CG. For example, the DCI may be a DG and may allocate resources for sidelink communication. In some other examples, the DCI may be a CG and may activate or deactivate a CG for sidelink communication.

Resource allocation for sidelink communication may be performed according to one or more modes, such as a first mode (Mode 1) or a second mode (Mode 2). In the first mode (Mode 1), a base station, such as a gNB, may assign one or more resources to be used by a TX UE and by an RX UE. To illustrate, the base station may transmit DCI in a Uu interface to the TX UE to grant the one or more resources to the TX UE for sidelink communication. In the second mode (Mode 2), the TX UE may autonomously select the one or more resources for the sidelink communication (e.g., instead of the base station assigning the one or more resources). Operation of an RX UE may be the same for both the first mode (Mode 1) and the second mode (Mode 2).

Figure 3:
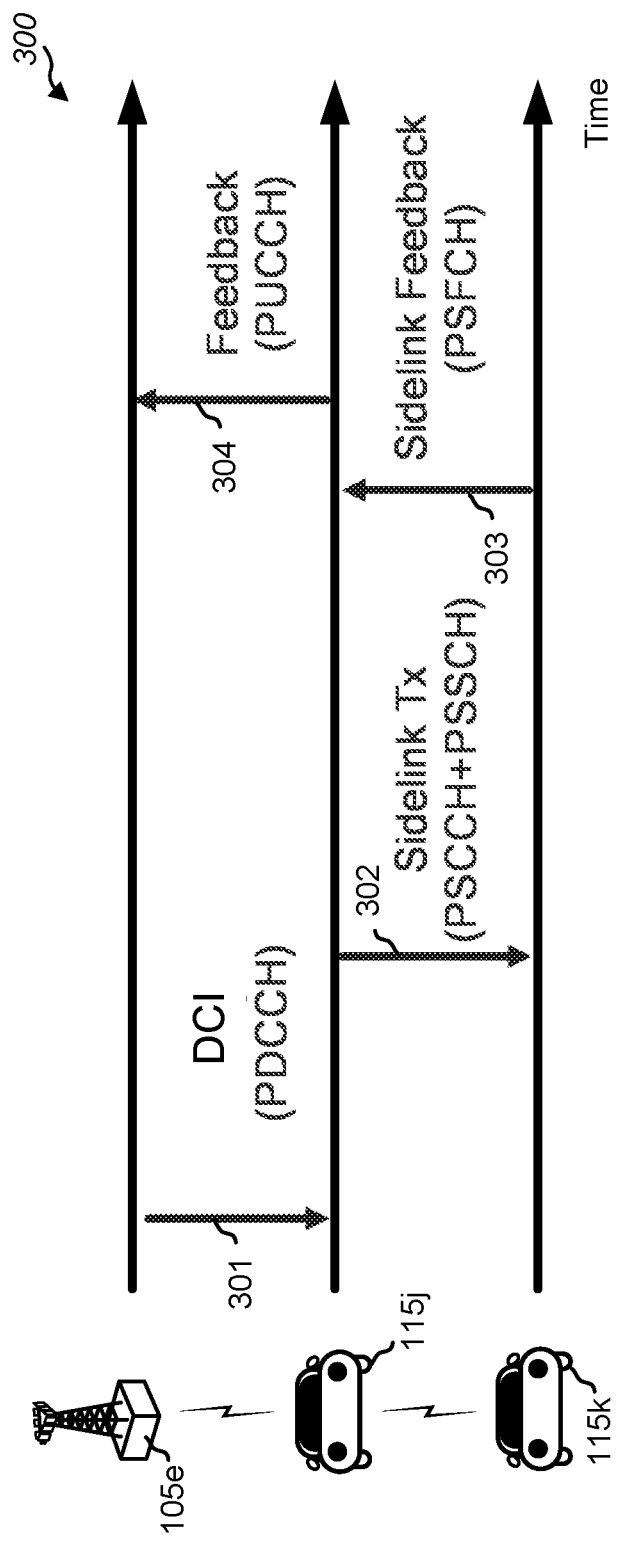
FIG. 3 is a diagram illustrating examples of operations that may be performed in connection with a vehicle-to-everything (V2X) wireless communication network according to some aspects of the disclosure.

FIG. 3 is a diagram illustrating examples of operations 300 that may be performed in connection with a V2X wireless communication network according to some aspects of the disclosure. The operations 300 may be described with reference to the UE 115j, the UE 115k, and the macro base station 105e. In some other examples, the operations 300 may be performed with respect to other UEs and other UE configurations.

The operations 300 may illustrate an example of the first mode (Mode 1) in which resource allocation of Tx resources for sidelink communications is performed by the base station 105e (e.g., through DCI 3_0). The base station 105 may transmit the DCI 3_0 to allocate time and frequency resources and to indicate transmission timing. The first mode (Mode 1) may support DGs, CGs of type 1, CGs of type 2, or both. A CG of type 1 may be activated via RRC signaling from the base station 105e. An MCS may be determined by the TX UE, such as UE 115k, within parameters set by the base station 105e.

In the operations 300 of FIG. 3, the base station 105a may transmit DCI to the UE 115j (e.g., using a PDCCH), at 301. In some examples, the DCI has a format 3_0 and may indicate a DG or CG of Type 2 to the UE 115j. At 302, the UE 115j may transmit SCI to the UE 115k.

At 302, the UE 115j may transmit one or more TBs to the UE 115k and SCI to the UE 115k via a sidelink. The sidelink may include a physical sidelink control channel (PSCCH) and a physical sidelink shared channel (PSSCH). The sidelink may optionally include a physical sidelink feedback channel (PSFCH).

At 303, the UE 115k may transmit sidelink feedback to the UE 115j via the sidelink (e.g., via the PSFCH), such as an acknowledgement (ACK) or a negative-acknowledgement (NACK). At 304, the UE 115j may forward the sidelink feedback to the base station 105e (e.g., using a PUCCH). The base station 105e may perform one or more operations based on the sidelink feedback, such as resource allocation, as an illustrative example.

Figure 4:
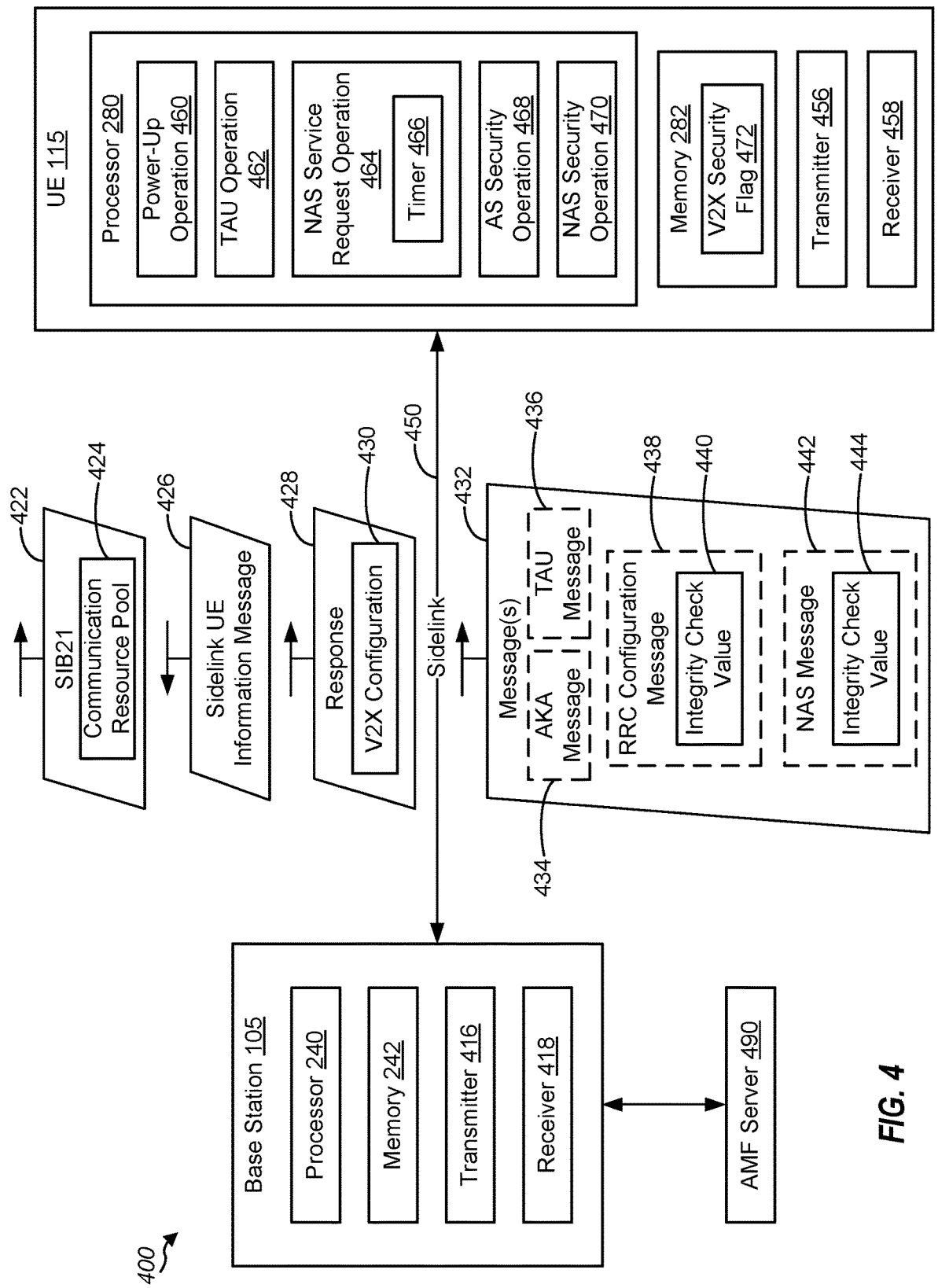
FIG. 4 is a block diagram illustrating an example of a wireless communication system according to some aspects of the disclosure.

FIG. 4 is a block diagram illustrating an example of a communication system 400 according to some aspects of the disclosure. The communication system 400 may include one or more base stations, such as the base station 105, and may further include one or more UEs, such as the UE 115 (e.g., the UE 115j described with reference to FIGS. 1 and 3). The communications system 400 may further include one or more servers, such as an access and mobility management function (AMF) server 490.

The example of FIG. 4 illustrates that the base station 105 may include one or more processors (e.g., the processor 240) and the memory 242. The base station 105 may further include a transmitter 416 and a receiver 418. The processor 240 may be coupled to the memory 242, to the transmitter 416, and to the receiver 418. In some examples, the transmitter 416 and the receiver 418 include one or more components described with reference to FIG. 2, such as one or more of the modulator/demodulators 232a-t, the MIMO detector 236, the receive processor 238, the transmit processor 220, or the TX MIMO processor 230.

FIG. 4 also illustrates that the UE 115 may include one or more processors (e.g., the processor 280) and the memory 282. The UE 115 may further include a transmitter 456 and a receiver 458. The processor 280 may be coupled to the memory 282, to the transmitter 456, and to the receiver 458. In some examples, the transmitter 456 and the receiver 458 include one or more components described with reference to FIG. 2, such as one or more of the modulator/demodulators 254a-r, the MIMO detector 256, the receive processor 258, the transmit processor 264, or the TX MIMO processor 266.

During operation, the base station 105 may transmit signals, such as a system information block of type 21 (SIB21) 422. The SIB21 422 may indicate parameters and control information associated with a sidelink 450. The sidelink 450 may include one or more of the PSCCH, the PSSCH, or the PSFCH described with reference to FIG. 3. To further illustrate, the SIB21 422 may indicate a communication resource pool 424 associated with the sidelink 450. One or more UEs 115 may receive the SIB21 424 and may communicate via the sidelink 450 using the communication resource pool 424. For example, the UEs 115i, 115j, and 115k of FIG. 1 may receive the SIB21 424 and may communicate with one another via the sidelink 450 using the communication resource pool 424.

In some implementations, the UE 115 may request a vehicle-to-everything (V2X) configuration 430 from the base station 105 to enable V2X communications associated with the sidelink 450. For example, the UE 115 may transmit a sidelink UE information message 426 to the base station 105. The sidelink UE information message 426 may request assignment of a V2X configuration to the UE 115 to enable the UE to perform V2X communications, such as communicating via the sidelink 450. In some examples, the sidelink UE information message 426 indicates data or parameters associated with the sidelink 450. For example, the sidelink UE information message 426 may indicate a number of resources requested by the UE 115 for communication via the sidelink 450.

Based on receiving the sidelink UE information message 426 from the UE 115, the base station 105 may transmit a response 428 to the UE 115. The response 428 may indicate a grant of the V2X configuration 430 to the UE 115, which may enable the UE 115 to communicate via the sidelink 450 (e.g., using the communication resource pool 424). In some examples, the response 428 includes one or more parameters responsive to a request indicated by the sidelink UE information message 426. For example, the V2X configuration 430 may indicate resources granted by the base station 105 to the UE 115 for communication via the sidelink 450. In some implementations, resources associated with the communication resource pool 424 may differ from resources associated with the V2X configuration 430. For example, the resources associated with the communication resource pool 424 may be used by multiple UEs including the UE 115, and the resources associated with the V2X configuration 430 may be reserved for the UE 115.

In some aspects of the disclosure, the UE 115 performs operations of a security verification process prior to performing one or more V2X communication operations. To illustrate, in some implementations, the UE 115 performs a SIB21 security verification process based on receiving the SIB21 422 and prior to communicating using the communication resource pool 424. To illustrate, the SIB21 security verification process may include receiving one or more messages 432 (e.g., from the base station 105) and may further include attempting to verify an identity of the base station 105 based on the one or more messages 432. In response to verifying the identity of the base station 105 based on the one or more messages 432, the UE 115 may communicate via the sidelink 450 using the communication resource pool 424 and based on a V2X wireless communication protocol. In some examples, in response to failure to verify the base station 105 based on the one or more messages 432, the UE 115 may avoid communicating using the communication resource pool 424.

In some examples, the UE 115 performs a particular procedure. For example, the processor 280 may be configured to initiate, perform, or control operations of the particular procedure. Based on the particular procedure, the UE 115 may initiate the SIB21 security verification process and may receive the one or more messages 432. To illustrate, the particular procedure may include or correspond to a power-up operation 460 of the UE 115. In such examples, the UE 115 may receive the one or more messages 432 in response to performing the power-up operation 460. Alternatively or in addition, the particular procedure may include or correspond to one or more other procedures, such as a tracking area update (TAU) operation 462 associated with the UE 115 or a non-access stratum (NAS) service request operation 464 that is performed with the AMF server 490.

To further illustrate, in some examples, the one or more messages 432 may include an authentication and key agreement (AKA) message 434. In such examples, the UE 115 may perform an AKA operation with the base station 105 and may receive the AKA message 434 from the base station 105 during the AKA operation. The UE 115 may verify the identity of the base station 105 based on the AKA message 434, such as based on a valid integrity check value that may be included in the AKA message 434. By completing the AKA operation using the AKA message 434, the UE 115 may verify the identity of the base station 105 (e.g., by determining that a malicious device is not "spoofing" messages to appear to originate from the base station 105).

Alternatively or in addition, the one or more messages 432 may include one or more other messages, such as one or more of a TAU message 436 including a valid integrity check value, a radio resource control (RRC) message 438 including a valid integrity check value 440, or an NAS message 442 including a valid integrity check value 444. In some examples, the UE 115 may receive the TAU message 436 from the base station 105 in connection with the TAU operation 462 (e.g., in response to entering a coverage area associated with the base station 105 after leaving another coverage area associated with another base station). The UE 115 may receive the NAS message 442 from the AMF server 490 via the base station 105 in response to initiating the NAS service request operation 464.

To further illustrate, in some examples, performing the NAS service request operation 464 includes initiating operation of a timer 466 associated with the NAS service request operation 464. For example, the UE 115 may initialize a value of the timer 466 and may adjust (e.g., increment or decrement) the value of the timer 466 during the NAS service request operation 464. If the value of the timer 466 reaches a particular value (e.g., zero, or another value), then the UE 115 may determine that the NAS service request operation 464 has timed out. Alternatively, if the UE 115 receives the NAS message 442 prior to expiration of the timer 466, and if the NAS message 442 includes the valid integrity check value 444, then the UE 115 may determine success of the NAS service request operation 464 (and may terminate operation of the timer 466).

In some examples, the UE 115 may be unable to verify the identity of the base station 105 based on the one or more messages 432 illustrated in the example of FIG. 4. To illustrate, in some cases, any of the one or more messages 432 may exclude authentication information (such as a valid integrity check value). As an illustrative example, FIG. 4 illustrates that the AKA message 434 and the TAU message 436 may exclude integrity check values. To further illustrate, in some cases, the base station 105 may exclude an integrity check value from the AKA message 434 in response to failing to obtain a UE security context associated with the UE 115. In such examples, upon receiving the AKA message 434, the UE 115 may re-initiate the AKA operation with the base station 105 based on determining that the AKA message 434 excludes an integrity check value. During the re-initiated AKA operation, the base station 105 may transmit a second AKA message to the UE 115 including an integrity check value, and the UE 115 may verify the identity of the base station 105 based on the second AKA message.

Accordingly, the UE 115 may use the one or more messages 432 to verify the identity of the base station 105. If the UE 115 determines that the one or more messages 432 verify the identity of the base station 105, then the UE 115 may enable communications that use the communication resource pool 424 (e.g., by setting a value of a V2X security flag 472). In some other examples, if the UE 115 determines that the one or more messages 432 fail to verify the identity of the base station 105, then the UE 115 may disable communications that use the communication resource pool 424 (e.g., by setting another value of the V2X security flag 472). To illustrate, in some implementations, the UE 115 includes a control circuit and a comparator circuit configured to determine whether one or both of the integrity check values 440, 444 are valid. The control circuit may perform a hash value based on one or more input values to determine a particular integrity check value. The control circuit may provide the particular integrity check value to an input of the comparator circuit. The comparator circuit may compare the particular integrity check value to the integrity check value 440 or the integrity check value 444 and to generate an output signal indicating whether the particular integrity check value matches the integrity check value 440 or the integrity check value 444.

In some examples, if the UE 115 fails to verify the identity of the base station 105 using the SIB21 security verification process, the UE 115 may avoid communication using the communication resource pool 424. In some other examples, upon verifying the identity of the base station 105 using the SIB21 security verification process, the UE 115 may use the communication resource pool 424 to communicate via the sidelink 450. For example, the UE 115 may transmit a message using the communication resource pool 424 via the sidelink 450, and one or more receiving devices may receive the message transmitted by the UE 115. In some examples, the UE 115 corresponds to one of the UEs 115*i-k* of FIG. 1, and the one or more receiving devices include one or more others of the UEs 115*i-k* of FIG. 1. As a particular example, the message may correspond to the sidelink transmission depicted at 302 in FIG. 3.

Alternatively or in addition to performing the SIB21 security verification process, in some examples, the UE 115 may perform a V2X configuration security verification process. In some examples, the UE 115 performs the V2X configuration security verification process to verify the identity of the base station 105 prior to communicating using the V2X configuration 430. After verifying the identity of the base station 105 using the V2X configuration security verification process, the UE 115 may communicate using the V2X configuration 430.

In some examples, the V2X configuration security verification process includes operations of an access stratum (AS) security operation 468. To illustrate, in some examples, performing the V2X configuration security verification process includes completing the AS security operation 468 prior to transmitting the sidelink UE information message 426. In such examples, the UE 115 may avoid transmitting the sidelink UE information message 426 until the UE 115 completes the AS security operation 468. Based on completion of the AS security operation 468, the UE may determine success of the V2X configuration security verification process and may transmit the sidelink UE information message 426.

In some other examples, performing the V2X configuration security verification process includes completing the AS security operation 468 after transmitting the sidelink UE information message 426 and prior to receiving the V2X configuration 430 from the base station 105. In such examples, the UE 115 may transmit the sidelink UE information message 426 and may initiate the AS security operation 468 after transmitting the sidelink UE information message 426. The UE 115 may complete the AS security operation 468 (and may determine success of the V2X configuration security verification process based on completion of the AS security operation 468) after transmitting the sidelink UE information message 426 and prior to receiving the V2X configuration 430. In some examples, the UE 115 determines success of the V2X configuration security verification process if the AS security operation 468 is completed prior to receiving the V2X configuration 430 and determines failure of the V2X configuration security verification process if the AS security operation 468 is completed after receiving the V2X configuration 430.

In some other examples, performing the V2X configuration security verification process includes completing the AS security operation 468 after transmitting the sidelink UE information message 426, after receiving the V2X configuration 430, and prior to communicating using the V2X configuration 430. In such examples, the UE 115 may avoid communicating using the V2X configuration 430 until completion of the AS security operation 468.

In some other examples, the V2X configuration security verification process includes operations of an NAS security operation 470. To illustrate, in some examples, performing the V2X configuration security verification process includes completing the NAS security operation 470 prior to transmitting the sidelink UE information message 426. In such examples, the UE 115 may avoid transmitting the sidelink UE information message 426 until the UE 115 completes the NAS security operation 470. Based on completion of the NAS security operation 470, the UE may determine success of the V2X configuration security verification process and may transmit the sidelink UE information message 426.

In some other examples, performing the V2X configuration security verification process includes completing the NAS security operation 470 after transmitting the sidelink UE information message 426 and prior to receiving the V2X configuration 430 from the base station 105. In such examples, the UE 115 may transmit the sidelink UE information message 426 and may initiate the NAS security operation 470 after transmitting the sidelink UE information message 426. The UE 115 may complete the NAS security operation 470 (and may determine success of the V2X configuration security verification process based on completion of the NAS security operation 470) after transmitting the sidelink UE information message 426 and prior to receiving the V2X configuration 430. In some examples, the UE 115 determines success of the V2X configuration security verification process if the NAS security operation 470 is completed prior to receiving the V2X configuration 430 and determines failure of the V2X configuration security verification process if the NAS security operation 470 is completed after receiving the V2X configuration 430.

In some other examples, performing the V2X configuration security verification process includes completing the NAS security operation 470 after transmitting the sidelink UE information message 426, after receiving the V2X configuration 430, and prior to communicating using the V2X configuration 430. In such examples, the UE 115 may avoid communicating using the V2X configuration 430 until completion of the NAS security operation 470.

In some examples, if the UE 115 fails to verify the identity of the base station 105 using the V2X configuration security verification process, the UE 115 may avoid communication using the V2X configuration 430. In some other examples, upon verifying the identity of the base station 105 using the V2X configuration security verification process, the UE 115 may use the V2X configuration 430 to communicate via the sidelink 450. For example, the UE 115 may transmit a message using the V2X configuration 430 via the sidelink 450, and one or more receiving devices may receive the message transmitted by the UE 115. In some examples, the UE 115 corresponds to one of the UEs 115i-k of FIG. 1, and the one or more receiving devices include one or more others of the UEs 115i-k of FIG. 1. As a particular example, the message may correspond to the sidelink transmission depicted at 302 in FIG. 3.

In some implementations, the UE 115 may use the V2X security flag 472 to indicate a result of a security verification process (such as the SIB21 security verification process or the V2X configuration security verification process). The UE 115 may store the V2X security flag 472 at a volatile or nonvolatile memory of the UE 115, at a processor (e.g., as a bit of a control register of the processor 280), at another device or component of the UE 115, or a combination thereof. The V2X security flag 472 may have either a first value (e.g., a logic zero value) indicating that the security verification process is incomplete (or has failed) or a second value (e.g., a logic one value) indicating that the security verification process has been completed successfully. The processor 280 may be configured to set the value of the V2X security flag 472. For example, based on verifying the identity of the base station 105 (e.g., by determining that one or both of the integrity check values 440, 444 are valid, as an illustrative example), the processor 280 may adjust the V2X security flag 472 from the first value to the second value.

The UE 115 may use the V2X security flag 472 to selectively enable or inhibit one or more V2X communications. To illustrate, the processor 280 may execute a program or application that initiates a communication that is to use the communication resource pool 424, the V2X configuration 430, or both. Prior to enabling the communication using the communication resource pool 424, the processor 280 may check (e.g., by performing a query operation) the value of the V2X security flag 472. In some examples, if the V2X security flag 472 has the first value, the processor 280 may decline the communication using the communication resource pool 424. For example, the processor 280 may disable the program or application from using the transmitter 456 to transmit a message. In some other examples, if the V2X security flag 472 has the first value, the processor 280 may enable the communication. For example, the processor 280 may enable the program or application to use the transmitter 456 to transmit a message.

Although certain examples are described separately for convenience, in some implementations, such examples may be combined without departing from the scope of the disclosure. For example, in some implementations, the UE 115 may perform both the SIB21 security verification process and the V2X configuration security verification process described above. In some examples, the SIB21 security verification process and the V2X configuration security verification process may "share" one or more operations. As an example, the one or more messages 432 may be used for both the SIB21 security verification process and the V2X configuration security verification process. As another example, upon determining a successful result of one or more of the AS security operation 468 or the NAS security operation 470, the UE 115 may determine success of both the SIB21 security verification process and the V2X configuration security verification process.

In some examples, after verifying the identity of the base station 105 using one or both of the SIB21 security verification process and the V2X configuration security verification process, the UE 115 may communicate using both the communication resource pool 424 and the V2X configuration 430, such as by transmitting traffic information, emergency information, or other information to one or more other UEs via the sidelink 450.

To further illustrate, in some implementations, the SIB21 security verification process and the V2X configuration security verification process may "share" the V2X security flag 472. In such examples, the identity of the base station 105 may be verified once. As an illustrative example, if the SIB21 security verification process sets the V2X security flag 472 to the second value while the V2X configuration security verification process is ongoing, the UE 115 may terminate the V2X configuration security verification process (based on detecting that the second value of the V2X security flag 472 indicates that the identity of the base station 105 has been verified). In some other examples, the SIB21 security verification process may use a first V2X security flag 472, and the V2X configuration security verification process may use a second V2X security flag 472. In this case, the UE 115 may perform the SIB21 security verification process independently of the V2X configuration security verification process, which may increase reliability of verification of the identity of the base station 105.

The transmitter 416, the receiver 418, the transmitter 456, and the receiver 458 may be configured to communicate one or more messages described herein. For example, the transmitter 416 may be configured to transmit the SIB21 422, the response 428, and the one or more messages 432, and the receiver 458 may be configured to receive the SIB21 422, the response 428, and the one or more messages 432. As another example, the transmitter 456 may be configured to transmit the sidelink UE information message 426, and the receiver 418 may be configured to receive the sidelink UE information message 426.

Although a single base station 105 has been described for convenience, in some implementations, the UE 115 may maintain a respective V2X security flag 472 for each of multiple base stations 105. In some examples, communications from the base station 105 include an identifier (ID) of the base station 105, and the UE 115 may associate the ID with the V2X security flag 472. The UE 115 may store the V2X security flag 472 for at least a threshold time period after terminating communication with the base station 105 (such as in response to leaving a coverage area of the base station 105 and registering with another base station). In response to returning to the coverage area of the base station 105 and initiating communication with the base station 105, the UE 115 may access the V2X security flag 472 to determine that the identity of the base station 105 has been previously verified.

In some implementations, a security verification process may be associated with a threshold time interval. If the UE 115 determines that the security verification process is incomplete upon expiration of the threshold time interval, the UE 115 may determine failure of the security verification process. To illustrate, the SIB21 security verification process may be associated with a first threshold time interval. The UE 115 may initiate the first threshold time interval upon receiving the SIB21 422. Upon verifying the identity of the base station 105 using the one or more messages 432, the UE 115 may determine success of the SIB21 security verification process and may terminate the first threshold time interval. In some other examples, if upon expiration of the first threshold time interval the UE 115 has failed to verify the identity of the base station 105 using the one or more messages 432, then the UE 115 may determine failure of the SIB21 security verification process. Alternatively or in addition, the V2X configuration security verification process may be associated with a second threshold time interval, which may correspond to the first threshold time interval or which may be different than the first threshold time interval. In some other examples, a security verification process may not be subject to a threshold time interval.

Although certain examples are described herein with reference to particular vehicles (such as a car), it is noted that aspects of the disclosure may be applicable to a wide variety of devices. For example, aspects of the disclosure may be applicable to a terrestrial vehicle (e.g., a car, a truck, a bicycle, or a motorcycle), an aquatic vehicle (e.g., a boat), an airborne vehicle (e.g., a drone or a plane), a wearable device (e.g., a smart watch), one or more other devices, or a combination thereof.

One or more aspects described herein may improve security of a V2X communication network and may reduce or eliminate ability of malicious devices to spread "false alarm" messages. For example, by verifying the identity of the base station 105 prior to communicating using the communication resource pool 424 or the V2X configuration 430, the UE 115 may avoid using resources granted by a "malicious" device presenting itself (e.g., using a spoofing technique) as the base station 105. As a result, such a malicious device may be unable to use the UE 115 to transmit a "false alarm" message using the resources.

Figure 5:
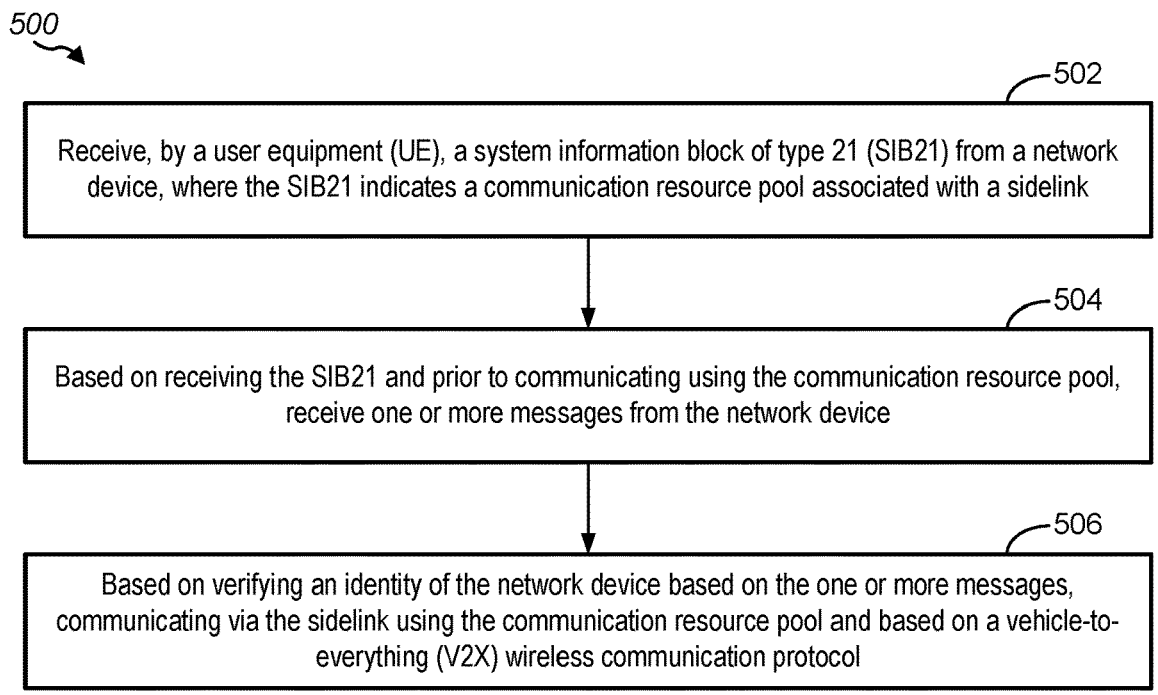
FIG. 5 is a flow chart illustrating an example of a method of wireless communication according to some aspects of the disclosure.

FIG. 5 illustrates an example of a method 500 of wireless communication according to some aspects of the disclosure. The method 500 may be performed by a UE, such as the UE 115.

The method 500 includes receiving, by a UE, a SIB21 from a network device, at 502. The SIB21 indicates a communication resource pool associated with a sidelink. To illustrate, the UE 115 may receive the SIB21 422 from the base station 105, and the SIB21 422 may indicate the communication resource pool 424 associated with the sidelink 450.

The method 500 further includes, based on receiving the SIB21 and prior to communicating using the communication resource pool, receiving one or more messages from the network device, at 504. To illustrate, the UE 115 may receive the one or more messages 432 from the base station 105 based on receiving the SIB21 422 and prior to communicating using the communication resource pool 424.

The method 500 further includes, based on verifying an identity of the network device based on the one or more messages, communicating via the sidelink using the communication resource pool and based on a V2X wireless communication protocol, at 506. For example, in response to verifying the identity of the base station 105 based on the one or more messages 432, the UE 115 may communicate via the sidelink 450 using the communication resource pool 424 and based on a V2X wireless communication protocol, such as by transmitting traffic information, emergency information, or other information to one or more other UEs via the sidelink 450.

Figure 6:
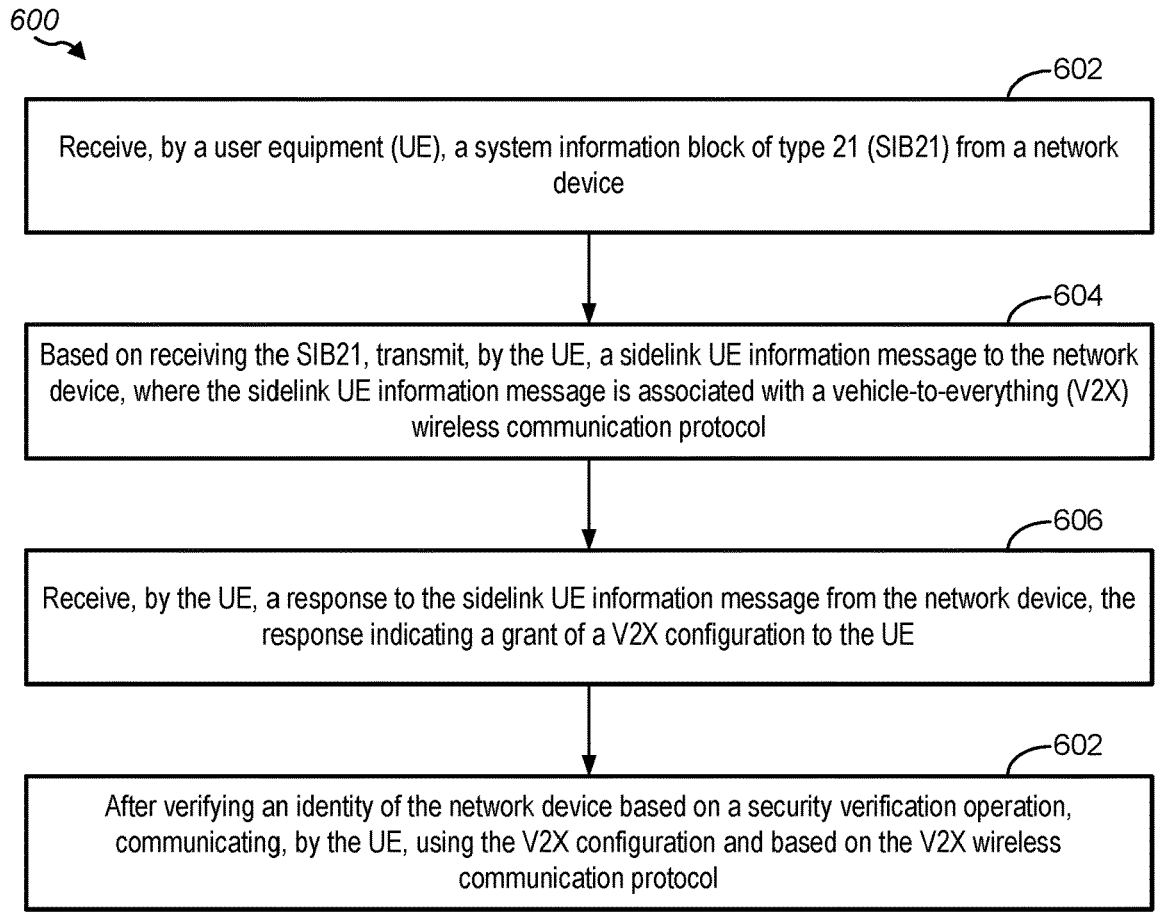
FIG. 6 is a flow chart illustrating another example of a method of wireless communication according to some aspects of the disclosure.

FIG. 6 illustrates an example of a method 600 of wireless communication according to some aspects of the disclosure. The method 600 may be performed by a UE, such as the UE 115.

The method 600 includes receiving, by a UE, a SIB21 from a network device, at 602. To illustrate, the UE 115 may receive the SIB21 422 from the base station 105.

The method 600 further includes, based on receiving the SIB21, transmitting, by the UE, a sidelink UE information message to the network device, at 604. The sidelink UE information message is associated with a V2X wireless communication protocol. For example, based on receiving the SIB21 422, the UE 115 may transmit the sidelink UE information message 426 to the base station 105.

The method 600 further includes receiving, by the UE, a response to the sidelink UE information message from the network device, at 606. The response indicates a grant of a V2X configuration to the UE. For example, the UE 115 may receive, from the base station 105, the response 428 to the sidelink UE information message 426, and the response 428 may indicate a grant of the V2X configuration 430 to the UE 115.

The method 600 further includes, after verifying an identity of the network device based on a security verification operation, communicating, by the UE, using the V2X configuration and based on the V2X wireless communication protocol, at 608. For example, after verifying the identity of the base station 105 using one or both of the AS security operation 468 or the NAS security operation 470, the UE 115 may communicate using the V2X configuration 430 via the sidelink 450 and based on a V2X wireless communication protocol, such as by transmitting traffic information, emergency information, or other information to one or more other UEs via the sidelink 450.

Figure 7:
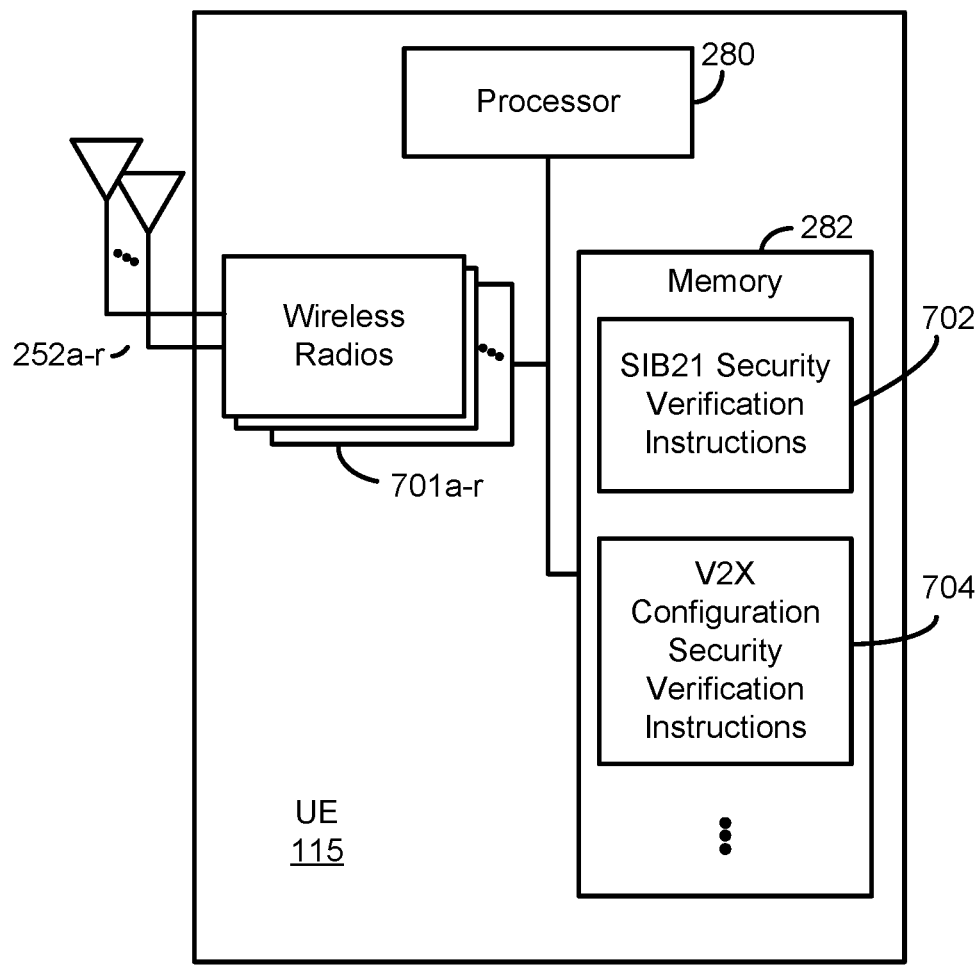
FIG. 7 is a block diagram illustrating an example of a UE according to some aspects of the disclosure.

FIG. 7 is a block diagram illustrating an example of a UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 701*a-r* and the antennas 252*a-r*. The wireless radios 701*a-r* may include one or more components or devices described herein, such as the modulator/demodulators 254*a-r*, the MIMO detector 256, the receive processor 258, the transmit processor 264, the TX MIMO processor 266, the transmitter 456, the receiver 458, one or more other components or devices, or a combination thereof.

The memory 282 may store instructions executable by the processor 280 to initiate, perform, or control one or more operations described herein. For example, the memory 282 may store SIB21 security verification instructions 702 executable by the processor 280 to initiate, perform, or control one or more operations of the SIB21 security verification process described with reference to FIG. 4, one or more operations of the method 500 of FIG. 5, or a combination thereof. Alternatively or in addition, the memory 282 may store V2X configuration security verification instructions 704 executable by the processor 280 to initiate, perform, or control one or more operations of the V2X configuration security verification process described with reference to FIG. 4, one or more operations of the method 600 of FIG. 6, or a combination thereof.

According to some further aspects, in a first aspect, a method of wireless communication includes receiving, by a UE, a SIB21 from a network device. The SIB21 indicates a communication resource pool associated with a sidelink. The method further includes receiving one or more messages from the network device based on receiving the SIB21 and prior to communicating using the communication resource pool. The method further includes communicating, based on verifying an identity of the network device based on the one or more messages, via the sidelink using the communication resource pool and based on a V2X wireless communication protocol.

In a second aspect alternatively or in addition to the first aspect, the method includes performing a power-on operation of the UE, and the one or more messages are received based on the power-on operation.

In a third aspect alternatively or in addition to one or more of the first through second aspects, the method includes performing a TAU operation associated with the UE, and the one or more messages are received based on the TAU operation.

In a fourth aspect alternatively or in addition to one or more of the first through third aspects, the method includes initiating an NAS service request operation, and the one or more messages are received in response to initiating the NAS service request operation.

In a fifth aspect alternatively or in addition to one or more of the first through fourth aspects, the method includes initiating operation of a timer associated with the NAS service request operation, the one or more messages include an NAS message received from an AMF server prior to expiration of the timer, and the NAS message has a valid integrity check value.

In a sixth aspect alternatively or in addition to one or more of the first through fifth aspects, the one or more messages include an AKA message.

In a seventh aspect alternatively or in addition to one or more of the first through sixth aspects, the one or more messages include an RRC configuration message received from the network device and having a valid integrity check value.

In an eighth aspect alternatively or in addition to one or more of the first through seventh aspects, he one or more messages include a TAU message.

In a ninth aspect alternatively or in addition to one or more of the first through eighth aspects, an apparatus for wireless communication includes a receiver configured to receive a SIB21 from a network device. The SIB21 indicates a communication resource pool associated with a sidelink. The receiver is further configured to receive, based on receiving the SIB21 and prior to communicating using the communication resource pool, one or more messages from the network device. The apparatus further includes a transmitter configured to communicate, based on verifying an identity of the network device based on the one or more messages, via the sidelink using the communication resource pool and based on a V2X wireless communication protocol.

In a tenth aspect alternatively or in addition to one or more of the first through ninth aspects, the apparatus includes a processor coupled to the receiver and to the transmitter, the processor is configured to initiate a power-on operation, and the one or more messages are received based on the power-on operation.

In an eleventh aspect alternatively or in addition to one or more of the first through tenth aspects, the apparatus includes a processor coupled to the receiver and to the transmitter, the processor is configured to initiate a TAU operation, and the one or more messages are received based on the TAU operation.

In a twelfth aspect alternatively or in addition to one or more of the first through eleventh aspects, the apparatus includes a processor coupled to the receiver and to the transmitter, the processor is configured to initiate an NAS service request operation, and the one or more messages are received in response to initiating the NAS service request operation.

In a thirteenth aspect alternatively or in addition to one or more of the first through twelfth aspects, the apparatus includes a timer associated with the NAS service request operation, the one or more messages include an NAS message received from an AMF server prior to expiration of the timer, the NAS message having a valid integrity check value.

In a fourteenth aspect alternatively or in addition to one or more of the first through thirteenth aspects, the one or more messages include an AKA message.

In a fifteenth aspect alternatively or in addition to one or more of the first through fourteenth aspects, the one or more messages include an RRC configuration message received from the network device and having a valid integrity check value.

In a sixteenth aspect alternatively or in addition to one or more of the first through fifteenth aspects, the one or more messages include a TAU message.

In a seventeenth aspect alternatively or in addition to one or more of the first through sixteenth aspects, a method of wireless communication includes receiving, by a UE, a SIB21 from a network device, and based on receiving the SIB21, transmitting, by the UE, a sidelink UE information message to the network device. The sidelink UE information message is associated with a V2X wireless communication protocol. The method further includes receiving, by the UE, a response to the sidelink UE information message from the network device. The response indicates a grant of a V2X configuration to the UE. The method further includes, after verifying an identity of the network device based on a security verification operation, communicating, by the UE, using the V2X configuration and based on the V2X wireless communication protocol.

In an eighteenth aspect alternatively or in addition to one or more of the first through seventeenth aspects, performing the security verification operation includes completing an AS security operation prior to transmitting the sidelink UE information message.

In a nineteenth aspect alternatively or in addition to one or more of the first through eighteenth aspects, performing the security verification operation includes completing an AS security operation after transmitting the sidelink UE information message and prior to receiving the V2X configuration.

In a twentieth aspect alternatively or in addition to one or more of the first through nineteenth aspects, performing the security verification operation includes completing an AS security operation after transmitting the sidelink UE information message, after receiving the V2X configuration, and prior to communicating using the V2X configuration.

In a twenty-first aspect alternatively or in addition to one or more of the first through twentieth aspects, performing the security verification operation includes completing an NAS security operation prior to transmitting the sidelink UE information message.

In a twenty-second aspect alternatively or in addition to one or more of the first through twenty-first aspects, performing the security verification operation includes completing an NAS security operation after transmitting the sidelink UE information message and prior to receiving the V2X configuration.

In a twenty-third aspect alternatively or in addition to one or more of the first through twenty-second aspects, performing the security verification operation includes completing an NAS security operation after transmitting the sidelink UE information message, after receiving the V2X configuration, and prior to communicating using the V2X configuration.

In a twenty-fourth aspect alternatively or in addition to one or more of the first through twenty-third aspects, an apparatus for wireless communication includes a receiver configured to receive a SIB21 from a network device and a transmitter configured to transmit, based on receiving the SIB21, a sidelink UE information message to the network device. The sidelink UE information message is associated with a V2X wireless communication protocol. The receiver is further configured to receive a response to the sidelink UE information message from the network device, and the response indicates a grant of a V2X configuration to the UE. The transmitter is further configured to communicate, after verification of an identity of the network device based on a security verification operation, using the V2X configuration and based on the V2X wireless communication protocol.

In a twenty-fifth aspect alternatively or in addition to one or more of the first through twenty-fourth aspects, the apparatus includes a processor configured to verify the identity of the network device based on an AS security operation prior to transmitting the sidelink UE information message.

In a twenty-sixth aspect alternatively or in addition to one or more of the first through twenty-fifth aspects, the apparatus includes a processor configured to verify the identity of the network device based on an AS security operation after transmitting the sidelink UE information message and prior to receiving the V2X configuration.

In a twenty-seventh aspect alternatively or in addition to one or more of the first through twenty-sixth aspects, the apparatus includes a processor configured to verify the identity of the network device based on an AS security operation after transmitting the sidelink UE information message, after receiving the V2X configuration, and prior to communicating using the V2X configuration.

In a twenty-eighth aspect alternatively or in addition to one or more of the first through twenty-seventh aspects, the apparatus includes a processor configured to verify the identity of the network device based on an NAS security operation prior to transmitting the sidelink UE information message.

In a twenty-ninth aspect alternatively or in addition to one or more of the first through twenty-eighth aspects, the apparatus includes a processor configured to verify the identity of the network device based on an NAS security operation after transmitting the sidelink UE information message and prior to receiving the V2X configuration.

In a thirtieth aspect alternatively or in addition to one or more of the first through twenty-ninth aspects, the apparatus includes a processor configured to verify the identity of the network device based on an NAS security operation after transmitting the sidelink UE information message and prior to receiving the V2X configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and devices described herein (e.g., one or more components, functional blocks, and devices of FIG. 2) may include one or more processors, electronics devices, hardware devices, electronics components, logical circuits, memories, software codes, firmware codes, etc., or any combination thereof. Those of skill would further appreciate that the various illustrative logical blocks, devices, circuits, and operations described herein may be implemented using electronic hardware, computer software, or combinations of both. To illustrate, various components, blocks, devices, circuits, and operations have been described above generally in terms of their functionality. Whether such functionality is implemented as hardware or software depends upon the particular application and design parameters of the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication performed by a user equipment (UE), the method comprising:
    receiving a system information block of type 21 (SIB21) from a network device, the SIB21 indicating a communication resource pool associated with a sidelink;
    in accordance with receiving the SIB21 and prior to communicating using the communication resource pool, receiving one or more messages from the network device; and
    in accordance with verifying an identity of the network device in accordance with the one or more messages, communicating via the sidelink using the communication resource pool and a vehicle-to-everything (V2X) wireless communication protocol.

2. The method of claim 1, further comprising performing a power-on operation of the UE, wherein the one or more messages are received in accordance with the power-on operation.

3. The method of claim 1, further comprising performing a tracking area update (TAU) operation associated with the UE, wherein the one or more messages are received in accordance with the TAU operation.

4. The method of claim 1, further comprising initiating a non-access stratum (NAS) service request operation, wherein the one or more messages are received in response to initiating the NAS service request operation.

5. The method of claim 4, further comprising initiating operation of a timer associated with the NAS service request operation, wherein the one or more messages include an NAS message received from an access and mobility management function (AMF) server prior to expiration of the timer, the NAS message having a valid integrity check value.

6. The method of claim 1, wherein the one or more messages include one or more of an authentication and key agreement (AKA) message, a radio resource control (RRC) configuration message received from the network device and having a valid integrity check value, or a tracking area update (TAU) message.

7. The method of claim 1, further comprising:
    receiving an alert from the network device; and
    delaying a retransmission of the alert until completing verifying the identity of the network device in accordance with the one or more messages,
    wherein performing the sidelink communication includes performing the retransmission of the alert to one or more other UEs using the communication resource pool and the V2X wireless communication protocol.

8. The method of claim 1, wherein the one or more messages include an authentication and key agreement (AKA) message, a tracking area update (TAU) message, a radio resource control (RRC) message, and a non-access stratum (NAS) message, and wherein the UE verifies the identity of the network device in accordance with the AKA message, the TAU message, a first integrity check value of the RRC message, a second integrity check value of the NAS message, an access stratum (AS) security procedure, and an NAS security procedure.

9. An apparatus for wireless communication, the apparatus comprising:
    a receiver configured to receive a system information block of type 21 (SIB21) from a network device, the SIB21 indicating a communication resource pool associated with a sidelink, and further configured to receive, in accordance with receiving the SIB21 and prior to communicating using the communication resource pool, one or more messages from the network device; and
    a transmitter configured to communicate, in accordance with verifying an identity of the network device in accordance with the one or more messages, via the sidelink using the communication resource pool and a vehicle-to-everything (V2X) wireless communication protocol.

10. The apparatus of claim 9, further comprising a processor coupled to the receiver and to the transmitter, wherein the processor is configured to initiate a power-on operation, and wherein the one or more messages are received in accordance with the power-on operation.

11. The apparatus of claim 9, further comprising a processor coupled to the receiver and to the transmitter, wherein the processor is configured to initiate a tracking area update (TAU) operation, and wherein the one or more messages are received in accordance with the TAU operation.

12. The apparatus of claim 9, further comprising a processor coupled to the receiver and to the transmitter, wherein the processor is configured to initiate a non-access stratum (NAS) service request operation, and wherein the one or more messages are received in response to initiating the NAS service request operation.

13. The apparatus of claim 12, further comprising a timer associated with the NAS service request operation, wherein the one or more messages include an NAS message received from an access and mobility management function (AMF) server prior to expiration of the timer, the NAS message having a valid integrity check value.

14. The apparatus of claim 9, wherein the one or more messages include an authentication and key agreement (AKA) message.

15. The apparatus of claim 9, wherein the one or more messages include a radio resource control (RRC) configuration message received from the network device and having a valid integrity check value.

16. The apparatus of claim 9, wherein the one or more messages include a tracking area update (TAU) message.

17. A method of wireless communication, the method comprising:
   receiving, by a user equipment (UE), a system information block of type 21 (SIB21) from a network device;
   based on receiving the SIB21, transmitting, by the UE, a sidelink UE information message to the network device, wherein the sidelink UE information message is associated with a vehicle-to-everything (V2X) wireless communication protocol;
   receiving, by the UE, a response to the sidelink UE information message from the network device, the response indicating a grant of a V2X configuration to the UE; and
   after verifying an identity of the network device based on a security verification operation, communicating, by the UE, using the V2X configuration and based on the V2X wireless communication protocol.

18. The method of claim 17, wherein performing the security verification operation includes completing an access stratum (AS) security operation prior to transmitting the sidelink UE information message.

19. The method of claim 17, wherein performing the security verification operation includes completing an access stratum (AS) security operation after transmitting the sidelink UE information message and prior to receiving the V2X configuration.

20. The method of claim 17, wherein performing the security verification operation includes completing an access stratum (AS) security operation after transmitting the sidelink UE information message, after receiving the V2X configuration, and prior to communicating using the V2X configuration.

21. The method of claim 17, wherein performing the security verification operation includes completing a non-access stratum (NAS) security operation prior to transmitting the sidelink UE information message.

22. The method of claim 17, wherein performing the security verification operation includes completing a non-access stratum (NAS) security operation after transmitting the sidelink UE information message and prior to receiving the V2X configuration.

23. The method of claim 17, wherein performing the security verification operation includes completing a non-access stratum (NAS) security operation after transmitting the sidelink UE information message, after receiving the V2X configuration, and prior to communicating using the V2X configuration.

24. An apparatus for wireless communication, the apparatus comprising:
   a receiver configured to receive a system information block of type 21 (SIB21) from a network device; and
   a transmitter configured to transmit, in accordance with receiving the SIB21, a sidelink UE information message to the network device, the sidelink UE information message is associated with a vehicle-to-everything (V2X) wireless communication protocol,
   the receiver is further configured to receive a response to the sidelink UE information message from the network device, the response indicating a grant of a V2X configuration to the UE, and
   the transmitter is further configured to communicate, after verification of an identity of the network device via a security verification operation, using the V2X configuration and based on the V2X wireless communication protocol.

25. The apparatus of claim 24, further comprising a processor configured to verify the identity of the network device in accordance with an access stratum (AS) security operation prior to transmitting the sidelink UE information message.

26. The apparatus of claim 24, further comprising a processor configured to verify the identity of the network device in accordance with an access stratum (AS) security operation after transmitting the sidelink UE information message and prior to receiving the V2X configuration.

27. The apparatus of claim 24, further comprising a processor configured to verify the identity of the network device in accordance with an access stratum (AS) security operation after transmitting the sidelink UE information message, after receiving the V2X configuration, and prior to communicating using the V2X configuration.

28. The apparatus of claim 24, further comprising a processor configured to verify the identity of the network device in accordance with a non-access stratum (NAS) security operation prior to transmitting the sidelink UE information message.

29. The apparatus of claim 24, further comprising a processor configured to verify the identity of the network device in accordance with a non-access stratum (NAS) security operation after transmitting the sidelink UE information message and prior to receiving the V2X configuration.

30. The apparatus of claim 24, further comprising a processor configured to verify the identity of the network device in accordance with a non-access stratum (NAS) security operation after transmitting the sidelink UE information message, after receiving the V2X configuration, and prior to communicating using the V2X configuration.

* * * * *